UNITED STATES PATENT OFFICE.

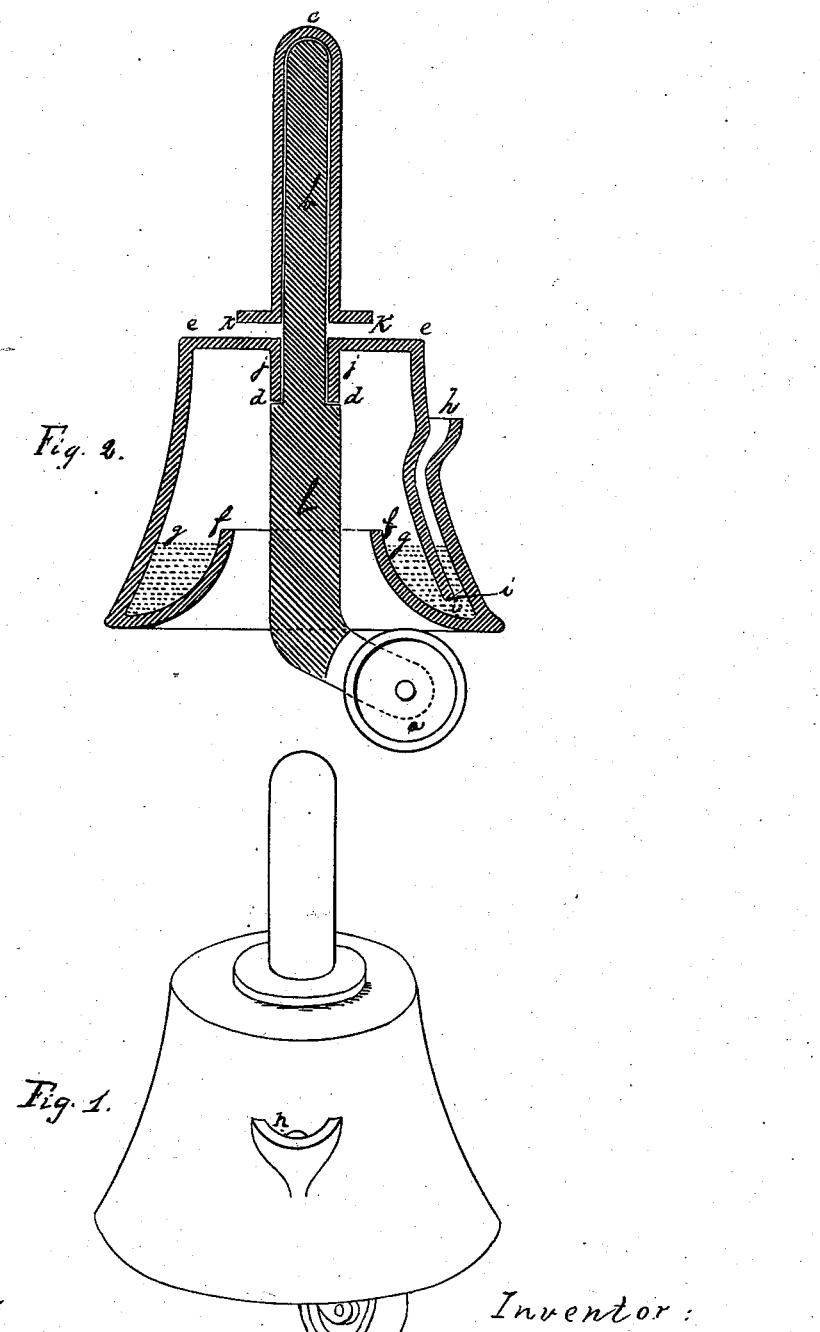

CHARLES H. TUMEY, OF AUSTIN, TEXAS.

CASTER.

SPECIFICATION forming part of Letters Patent No. 260,259, dated June 27, 1882.

Application filed April 3, 1882. (No model.)

*To all whom it may concern:*

Be it known that I, CHARLES H. TUMEY, a citizen of the United States, residing at Austin, in the county of Travis and State of Texas, have invented a new and useful Improvement in Furniture-Casters, of which the following is a full, clear, and exact description, sufficient to enable others skilled in the art to make and use the same.

The present invention relates to that class of casters or roller attachments for the legs of household-furniture, bee-hives, and other objects liable to the inroads of insects in which the ascent or passage of the latter is prevented by a cup or receptacle containing a poisonous liquid.

The invention consists in a cup shaped shell having a bowl or liquid-receptacle at its lower edge and a filling orifice or passage extending through the shell and leading to the bottom of the liquid-receptacle. A socket or inwardly-projecting tube at the top of the shell encircles the shank of the caster and rests upon a shoulder on said shank, which serves to hold the insect-guard in position.

In the drawings, Figure 1 is a perspective view of my insect-guard applied to a caster. Fig. 2 is a cross-section illustrating the construction of the caster and mode of use.

The caster consists in the first instance of the ordinary roller, $a$, as in general use, and the stem $b$, which works in the socket $c$, which is inserted into the leg of a table, safe, or other article of furniture on which it is proposed to be used.

At $d$ there is a shoulder on the stem $b$, upon which rests the bowl $e\ e$. This bowl is to be made of china, porcelain, glass, or of any metal. The lower edge of the bowl is turned up on the inside, as shown at $f f$, thus forming a secret bowl, as shown at $g g$, where the liquid or other substance used is hidden from view and is out of the reach of children, rendering the use of the caster free from danger if any poisonous substance is used; also, preventing dust from accumulating in the bowl, and at same time preventing to some extent evaporation. The substance used in the bowl is poured in at the hole $h$, which is formed in one side of the bowl, where it is made thicker than at other points. This opening extends almost to the bottom of the bowl, so that the lower opening is always beneath the surface of the liquid used, as shown at $i$, thus rendering it impossible for any insect to crawl through the tube to the outside of the bowl. The bowl $e\ e$ is slipped over the stem $b$ before the stem is inserted into the socket $c$ by means of the neck $j j$.

The stem $b$, from the top of the bowl to the top of the stem, is made a little longer than the socket $c$, so as to leave a space between the bowl and the bottom of the socket, as shown at $k\ k$.

Having thus described my invention, what I claim, and desire to secure by Letters Patent, is—

The cup-shaped shell having an interior bowl or liquid-receptacle at its lower edge, an interior tube or socket at its top, and a passage extending through the shell in a downward direction and terminating at or near the bottom of the interior bowl, in combination with a caster and its shank or stem provided with a shoulder or stop, as and for the purpose herein set forth.

CHARLES HENRY TUMEY.

Witnesses:
E. B. HANCOCK,
JOHN B. COSTA.